United States Patent [19]

Rotherham

[11] Patent Number: 4,821,940
[45] Date of Patent: Apr. 18, 1989

[54] T-NUT INSERTION MACHINE
[75] Inventor: Alan C. Rotherham, Girraween, Australia
[73] Assignee: Tee-Sert Pty. Ltd., Girraween, Australia
[21] Appl. No.: 20,117
[22] Filed: Feb. 27, 1987
[30] Foreign Application Priority Data Feb. 28, 1986 [AU] Australia .............................. PH4826

[51] Int. Cl.⁴ ........................................... B23P 19/00
[52] U.S. Cl. .................................. 227/107; 227/112; 29/809; 29/798
[58] Field of Search ......................... 227/107, 103, 112; 406/28, 87; 221/236, 278; 29/809, 798

[56] References Cited

U.S. PATENT DOCUMENTS

| 2,398,659 | 4/1946 | Mead | 10/162 |
| 3,266,667 | 8/1966 | MacDonald | 221/236 |
| 3,339,799 | 9/1967 | Spisak | 221/236 |
| 3,448,236 | 6/1969 | Spisak | 221/278 |
| 3,528,157 | 9/1970 | McGee | 29/200 |
| 4,164,072 | 8/1979 | Shinjo | 29/720 |
| 4,633,560 | 1/1987 | Muller | 29/243.52 |

FOREIGN PATENT DOCUMENTS 3446978 12/1984 Fed. Rep. of Germany .
239978 8/1985 German Democratic Rep. .

Primary Examiner—Frank T. Yost
Assistant Examiner—James L. Wolfe
Attorney, Agent, or Firm—Fitch, Even, Tabin & Flannery

[57] ABSTRACT

A machine 10 to insert "T Nuts" 77 into a piece of timber, the machine 10 including a pneumatically operated insertion assembly 12 having an air nozzle 46 which moves the "T-Nut" 77 to an insertion location and a pneumatically operated ram 20 which has a piston 26 movable from a retracted position to an extended position inserting the "T-Nut" 77.

13 Claims, 4 Drawing Sheets 4,821,940

T-NUT INSERTION MACHINE

The present invention relates to the manufacture of furniture and more particularly but not exclusively to an apparatus for the insertion of "T-Nuts" into timber products particularly furniture.

In the construction of furniture "T-Nuts" are employed to secure various parts of the pieces of furniture together. Each of these "T-Nuts" consists of a generally circular base from which there extends an annular flange defining a passage which is threaded. The base has projections (spikes) which are engaged within a piece of timber when the annular flange is located within a hole preformed in the piece of timber. Traditionally these "T-Nuts" have been inserted by hands using a hammer.

The manual insertion of "T-Nuts" has several disadvantages which all stem from the time consuming nature of inserting the "T-Nuts" by hand. The major disadvantage is the cost resulting from the labour intensive job described above.

It is the object of the present invention to overcome or substantially ameliorate the above disadvantages.

There is disclosed herein a machine to insert "T-Nuts" into an object providing a passage to receive a portion of a "T-Nut" to be fixed to the object, said machine comprising a body, "T-Nut" supply means mounted on the body and adapted to locate the "T-Nuts", at least one at a time, at a predetermined location, an insertion assembly to fix the "T-Nut" to the object so as to project into said passage, said insertion assembly including transfer means to transfer a "T-Nut" from said predetermined location to an insertion location, and motor means to engage the "T-Nut" at said insertion location so as to apply a force thereto to fix the "T-Nut" to said object.

A preferred form of the present invention will now be described by way of example with reference to the accompanying drawings, wherein:

FIG. 1a is an enlarged perspective view of a "T-Nut" for use in the machine of FIG. 1;

Figure 1:
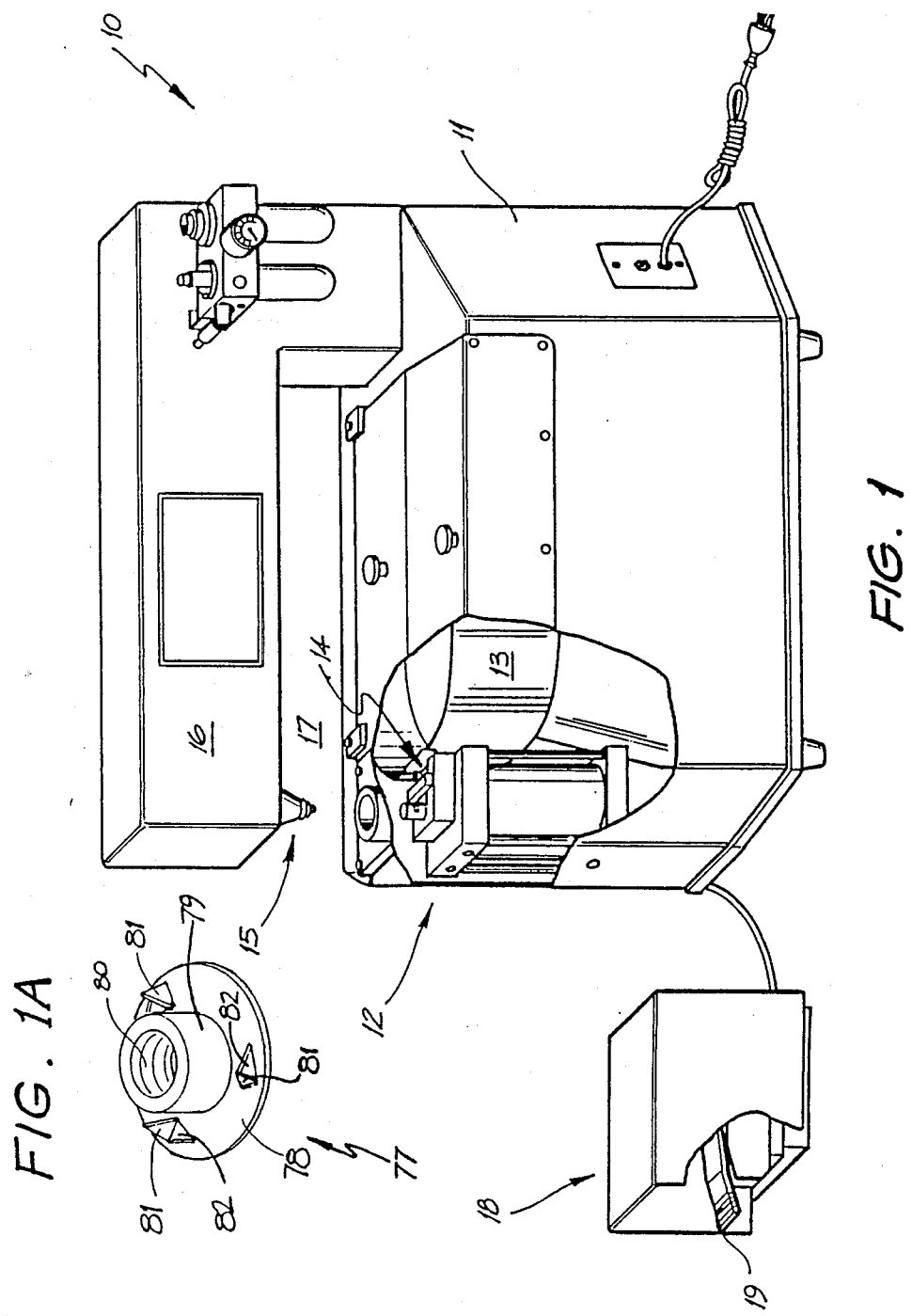
FIG. 1 is a schematic perspective view of a "T-Nut" insertion machine according to the invention.

In FIG. 1a there is illustrated a "T-Nut" 77 having a circular base 78 and an annular flange 79. The flange 79 provides a threaded passage 80. Punched from the base 78 are spikes 81, so that holes 82 are formed. In use the flange 79 is received in a circular hole formed in a piece of timber. The spikes 81 are driven into the timber to receive the "T-Nut" 77 in position.

In the accompanying drawings there is schematically depicted a "T-Nut" insertion machine 10 having a body 11 housing an insertion assembly 12. The assembly 12 receives "T-Nuts" from a vibratory feeder 13 which delivers "T-Nuts" in a particular orientation to the opening 14. Also mounted on the body 11 is a locating pin assembly switch 15 vertically aligned with the insertion assembly 12. As can be noted the locating assembly 12 and safety switch 15 are mounted on an arm 16 below which there is defined a recess 17 into which a timber product is introduced. The timber product has a passage which receives the annular flange of the "T-Nut" to be inserted by the insertion assembly 12. Controlling the operation of the assembly 12 is an operator station 18 having a pedal 19 manipulated by the operator.

Figures 2, 3:
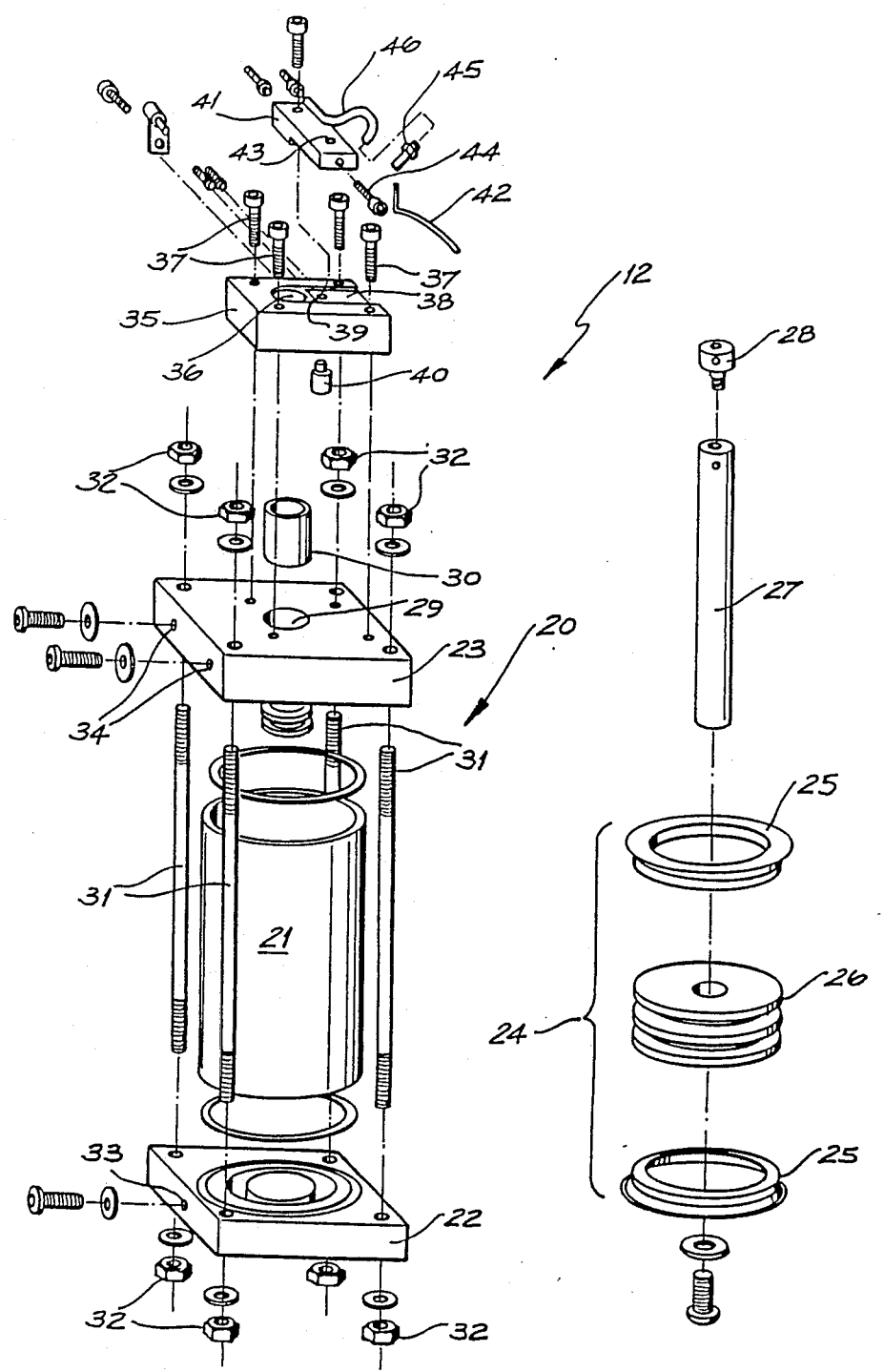
FIG. 2 is a schematic parts exploded view of a pneumatic ram and "T-Nut" delivery assembly employed in the machine of FIG. 1.
FIG. 3 is a schematic parts exploded perspective view of the piston assembly of the pneumatic ram of FIG. 2.

Turning now in particular to FIGS. 2 and 3 wherein the insertion assembly 12 is more fully depicted in a parts exploded perspective view, the assembly 12 includes a pneumatic ram 20 having a cylinder 21 closed at each end by end plates 22 and 23. Located within the cylinder 21 is a piston assembly 24 including seals 25 and piston 26. Extending upwardly from the piston 26 and attached thereto is a piston rod 27 terminating at its upper end with a locater member 28. The piston assembly 24 sealingly divides the pneumatic chamber within the cylinder 21 into upper and lower sub-chambers. The end plate 23 is provided with a central passage 29 through which the piston rod 27 sealingly passes via a bush 30. The two end plates 22 and 23 are held in position by means of threaded rods 31 and nuts 32. Air is delivered to the interior of the cylinder 21 by means of passages 33 and 34.

Mounted on the plate 23 is a "T-Nut" delivery member 35 having a passage 36 through which the rod 27 and member 28 pass to engage a "T-Nut" to force the "T-Nut" into the piece of timber positioned thereabove. The member 35 is secured to the plate 23 by means of bolts 37. Extending in from one edge of the member 35 is a slot 38 which delivers the "T-Nut" to a position partly projecting into the passage 36 and resting on top of the locating member 28. The slot 38 has an upwardly extending step 39 against which the "T-Nut" abuts prior to delivery to a position above the passage 36. Formed in the member 35 is a passage which receives a piston 40. The piston 40 is air driven and raises the "T-Nut" over the step 39.

Located above the piston 40 is a stop member 41 which in co-operation with the slot 38 defines a space within which a "T-Nut" is located prior to being delivered to the passage 36. Mounted on the stop member 41 is a wire 42 which projects into the opening 14 to guide the "T-Nuts" from within the vibratory feeder 13 to the recess 38. The wire 42 has one end received within a passage 43 and is clamped in position by means of a screw 44. Also mounted on the stop member 41 is a nozzle 45 which directs air to engage the "T-Nut" abutting the step 39. The nozzle 45 is mounted on a rigid tube 46 fixed to the member 41.

Figure 4:
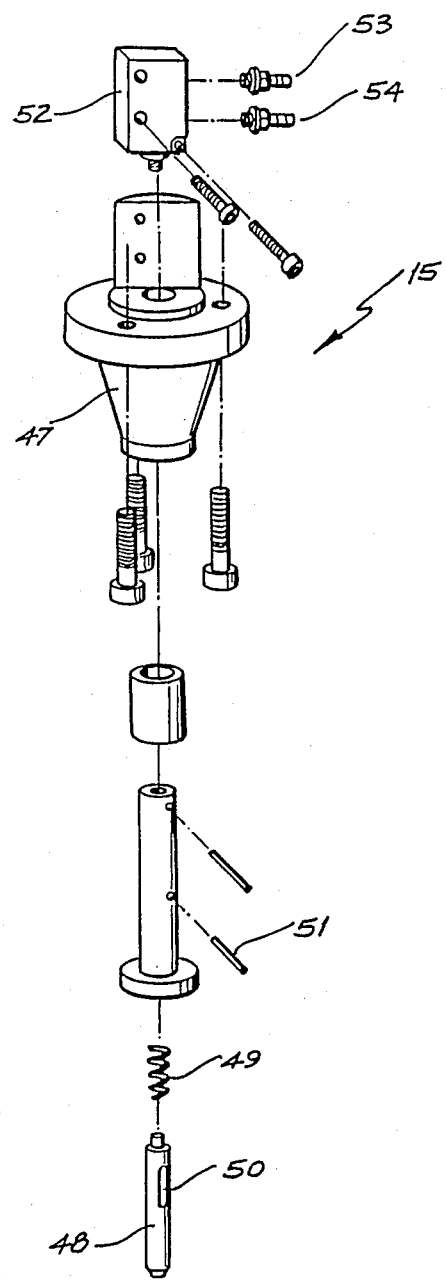
FIG. 4 is a schematic parts exploded perspective view of a locating pin assembly and safety switch employed in the machine of FIG. 1.
Figure 5:
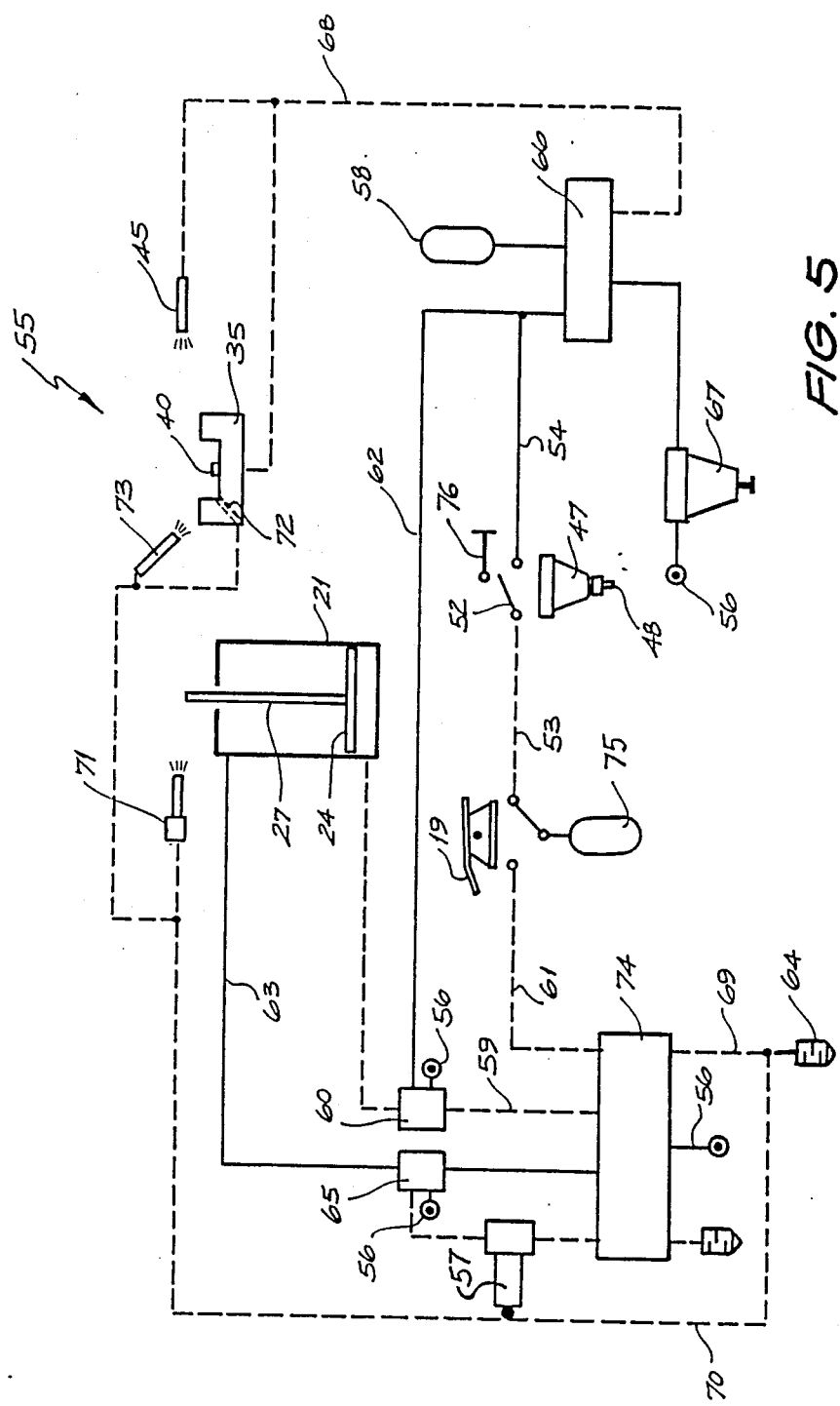
FIG. 5 is a schematic pneumatic circuit diagram for the machine of FIG. 1.

Turning now to FIG. 4 wherein the locater pin assembly 15 and safety switch 15 is more fully depicted. The assembly 15 includes a main body 47 within which there is mounted a movable piston 48 biased to an extended position by means of a spring 49. The piston 48 is retained in position by means of a slot 50 engaged by a pin 51. The piston 48 operates a switch 52 to selectively connect pneumatic lines 53 and 54. More particularly upon the piston 48 being moved to a retracted position, the lines 53 and 54 are connected to allow the flow of compressed air therebetween.

Turning now to the pneumatic circuit 55, the various pneumatic components of the machine 10 are schematically depicted. The pneumatic circuit 55 includes main pressure supply lines 56 and reservoirs 75 and 58. The reservoir 75 stores sufficient compressed air to actuate, once only per charge, a main spool valve 74. Thereafter main pressure air is delivered to the line 59 via a port sensor 60 to one end of the cylinder 21 to cause the piston rod 27 to rise and insert a "T-Nut" located in the passage 36. Once the spool valve has been actuated by the delivery of the charge of air from the reservoir 75 to the line 61, by the depression of the pedal 19, the spool valve 74 remains in the activated position. While air is passing through the line 59 the port sensor 60 isolates the line 62 from the main air supply 56. Once the piston 24 has reached its uppermost limit, the port sensor 60 allows the delivery of main pressure air to the line 62. Air is exhausted from above the piston 24 via line 63. This exhaust air is delivered via valve 74 to a silencer 64. Located in the line 63 is a port sensor 65 which delivers main pressure air to a timer valve 57 when air ceases to flow through the line 63. The timer valve 57 after a predetermined period of time delivers air to the valve 74 to move the valve 74 to the start position. Again it should be appreciated that the port sensor 65 only delivers air to the timer valve 57 when air ceases to flow through the line 63.

The reservoir 75 is charged upon air being delivered to the line 62 and then subsequently to the line 54. Air delivered to the line 62 also operates the injection valve 66 so that air is selectively delivered to the reservoir 58 from the regulator 67. Additionally the valve 66 selectively delivers a charge of air from the reservoir 58 to the line 68.

Communicating with the line 68 is the piston 40 which raises the "T-Nut" over the step 39. Also communicating with the line 68 is the injector nozzle 45 which moves the raised "T-Nut" to a position partly projecting into the passage 36 and resting on the member 28. Extending from the valve 74 to the silencer 64 is a line 69. Extending from the line 69 is a further line 70 which delivers exhaust air to a first reject nozzle 71 and a second reject nozzle 72. The reject nozzle 72 is formed in the delivery member 35. This exhaust air passing through the line 70 is also delivered to a feeder nozzle 73. The feeder nozzle aids in moving the "T-Nut" from the opening 14 to a position abutting the step 39. The ejector nozzle 71 removes a "T-Nut" still located on the member 28 after a completed stroke of the piston rod 27, if such a problem has occurred. The ejector nozzle 72 removes a "T-Nut" from the position adjacent the step 39, if the "T-Nut" has not been moved by the nozzle 45 to a position on top of the member 28.

In operation of the above-described pneumatic circuit, air is delivered to the reservoir 75 upon the piston 48 being engaged by a piece of wood moved by the operator. Upon the piston 48 being moved to a retracted position air is delivered from the line 54 to 53. It should be further be noted that air can only be delivered to the line 54 if the piston 24 is stationary, that is the piston 24 would have to be at the top or bottom of its stroke. Air from the line 53 is automatically fed to the reservoir 75. Upon the operator depressing the pedal 19, air from the reservoir 75 is delivered as control air to operate the valve 74. The valve 74 is moved to the operative position wherein main pressure air is delivered from the line 56 to the lower surface of th piston 24, via the port sensor 60. While air is passing through the port sensor 60, air is no longer delivered to the line 54. Upon the piston 24 reaching the top of its stroke and exhaust air ceasing to flow through the line 63, main pressure air is delivered to the timer valve 57 which will subsequently cause operation of the valve 74 to return the valve 74 to the start position. Thereafter main pressure air is delivered to the line 63 to return the piston 24 to its start position. During this operation exhaust air then passes through the line 59 to be exhausted via the line 69 to the silencer 64. However during this operation part of the exhaust air is delivered to the line 70 to operate the nozzles 71, 72 and 73. It should further be appreciated that when main pressure air is delivered to the line 62, the valve 66 is operated so that air in the reservoir 58 is delivered to the line 68. In the rest position, the valve 66 delivers air from the regulator 67 to the reservoir 58. The piston 48 and switch 52 act as a safety switch in that if the piston 48 is not retracted by the operator inserting a piece of wood in the appropriate position, the switch 52 dumps air from the reservoir 75 via line 76 to atmosphere.

If so required several locating members 28 can be provided and be of different sizes. This then allows the operator to select the locating member 28 to suit the particular sized "T-Nut" being used.

As a further adjustment, the timer valve 57 can be altered to suit different materials into which the "T-Nuts" are being inserted.

What I claim is:

1. A machine to insert "T-nuts" into an object provided with a passage for receiving a portion of a "T-nut" to be fixed to the object, said machine comprising a body; "T-nut" supply means mounted on the body and adapted to locate the "T-nuts", at least one at a time, at a predetermined location; an insertion assembly mounted on said body and positioned to receive the "T-nuts" from said supply means and to fix the "T-nut" to the object so as to project into said passage, said insertion assembly including transfer means mounted on said body adjacent said predetermined location for transferring a "T-nut" from said predetermined location to an insertion location adjacent said predetermined location, and motor means mounted on said body adjacent said insertion location for engaging the "T-nut" at said insertion location so as to apply a force thereto to fix the "T-nut" to said object, wherein said predetermined location is defined by a step terminating a slot against which the "T-nut" is abutted to be located at said predetermined location, and wherein said transfer means includes a nozzle for directing an air jet at the "T-nut", which air jet moves the "T-nut" from said predetermined location to said insertion location, and means for raising the "T-nut" above said step so that said nozzle can move the "T-nut" to said insertion location.

2. The machine of claim 1 wherein the means for raising the "T-nut" includes a piston which engages the "T-nut", which piston is movable from a retracted position to a raised position locating the "T-nut" above said step.

3. The machine of claim 1 wherein said motor means is a ram having a piston movable between a retracted position and an extended position, with said "T-nut" being inserted by movement of the ram piston between the extended and retracted positions by movement through said insertion location.

4. A machine to insert "T-nuts" into an object provided with a passage for receiving a portion of the "T-nut" to be fixed to the object, said machine comprising a body; "T-nut" supply means mounted on the body and adapted to locate the "T-nuts", at least one at a time, at a predetermined location; an insertion assembly mounted on said body and positioned to receive the "T-nuts" from said supply means and to fix the "T-nut" to the object so as to project into said passage, said insertion assembly including transfer means mounted on said body adjacent said predetermined location for transferring a "T-nut" from said predetermined location to an insertion location, motor means mounted on said body adjacent said insertion location for engaging the "T-nut" at said insertion location so as to apply a force thereto to fix the "T-nut" to said object; and locating means for engaging the object to align said passage with said insertion position.

5. The machine of claim 4 wherein said locating means is a locating piston having a leading portion to engage said passage; and said machine further including switch means for preventing actuation of the machine until said leading portion is engaged within said passage.

6. The machine of claim 5 wherein said insertion location is adjacent said predetermined location, and said predetermined location is defined by a step terminating a slot against which the "T-nut" is abutted to be located at said predetermined location, and wherein said transfer means includes a nozzle for directing an air jet at the "T-nut", which air jet moves the "T-nut" from said predetermined location to said insertion position, and a piston which engages the "T-nut" and raises the "T-nut" above said step so that said nozzle can move the "T-nut" to said insertion position.

7. The machine of claim 6 wherein said motor means is a ram having a piston movable between a retracted position and an extended position with said "T-nut" being inserted by movement of the piston between the retracted and the extended positions by movement through said insertion location.

8. The machine of claim 7 further including a pneumatic circuit which delivers air to said jet, ram and locating piston to actuate said jet, ram and locating piston; said circuit including a main pressure supply means; a first reservoir to receive air under pressure from said supply means; main valve means to selectively direct air under pressure from said supply means to said ram to cause movement thereof to insert a "T-nut"; and operator manipulable valve to selectively connect said first reservoir to said main valve means to cause actuation of said main valve means to connect said supply means with said ram, wherein said first reservoir stores sufficient air to cause only a single operation of said main valve means until it is recharged.

9. The machine of claim 8 wherein said operator manipulable valve means has a first working position connecting said first reservoir with said main valve means and a second working position allowing air under pressure to be delivered to said first reservoir while isolating said first reservoir from said main valve means.

10. The machine of claim 9 further including a safety valve actuated by said locating means, which safety valve dumps air from said first reservoir if an operator of the machine has not positioned the object to receive the "T-nut" so that the passage thereof is aligned with said insertion position.

11. The machine of claim 10 wherein said safety valve allows main pressure air to be delivered to said first reservoir when the object to receive the "T-nut" is correctly positioned.

12. The machine of claim 11 further including valve means for directing air to said nozzle during a return stroke of said ram piston after inserting a "T-nut".

13. The machine of claim 12 wherein said main valve means has a first position connecting said ram with said supply means and a second position isolating said ram with said supply means, and wherein said machine further includes a timer valve to operate said valve means to isolate said ram from said supply means after the completion of the return stroke of the ram piston.

* * * * *

UNITED STATES PATENT AND TRADEMARK OFFICE
CERTIFICATE OF CORRECTION

PATENT NO.   : 4,821,940
DATED        : April 18, 1989
INVENTOR(S)  : Alan C. Rotherham It is certified that error appears in the above-identified patent and that said Letters Patent is hereby corrected as shown below:

Column 6, Line 34:   Change "with" to --from--.

Signed and Sealed this

Twenty-first Day of November, 1989

Attest:

JEFFREY M. SAMUELS

Attesting Officer     Acting Commissioner of Patents and Trademarks